United States Patent [19] [11] 4,342,669
Wilson et al. [45] Aug. 3, 1982

[54] FIRE-RETARDANT INSULATING COMPOSITION AND ITS PRODUCTION

[75] Inventors: Joseph F. Wilson, Bartlesville, Okla.; Robert S. Parish, Broomfield, Colo.

[73] Assignee: Phillips Petroleum Company, Bartlesville, Okla.

[21] Appl. No.: 120,434

[22] Filed: Feb. 11, 1980

[51] Int. Cl.³ .......................... C09K 3/28; C09D 5/18
[52] U.S. Cl. ................................ 252/602; 106/18.16; 252/62; 252/607; 423/309; 428/921
[58] Field of Search ............... 252/602, 607; 428/921; 106/18.16; 423/309

[56] References Cited

U.S. PATENT DOCUMENTS

| | | | |
|---|---|---|---|
| 2,661,264 | 12/1953 | Malowan | 423/302 |
| 2,935,471 | 5/1960 | Aarons et al. | 252/8.1 |
| 3,131,992 | 5/1964 | Jones | 71/32 X |
| 3,196,108 | 7/1965 | Nelson | 252/2 |
| 3,334,045 | 8/1967 | Nelson | 252/2 |
| 3,388,966 | 6/1968 | MacDonald | 423/309 |
| 3,398,019 | 8/1968 | Langguth et al. | 428/921 X |
| 3,420,623 | 1/1969 | Barker | 423/307 |
| 4,105,566 | 8/1978 | Miller et al. | 106/18.16 X |
| 4,174,223 | 11/1979 | Steen | 106/18.16 |

OTHER PUBLICATIONS

Achorn et al., "Commercial Uses of the Pipe Reactor Process for Production of High-Polyphosphate Liquids", Solutions, Mar.-Apr. 1973, pp. 46, 48, 52, 54.

Anderson, "Boric Acid Future in Insulation Uncertain", C & EN, Apr. 10, 1978, pp. 11-14.

Primary Examiner—Richard D. Lovering

[57] ABSTRACT

A method for producing a fire retardant insulating composition in which a fire retardant amount of monoammonium phosphate (MAP) having polyphosphate content of the range about 0 to about 10 weight percent is incorporated into a cellulose-base insulating material to produce a nontacky, fire retardant insulating composition. In an embodiment of the invention the monoammonium phosphate having a polyphosphate content in the range of up to about 10 weight percent is prepared by (1) contacting $NH_3$ with an aqueous solution of $H_3PO_4$ at a temperature of up to 177° C. to form MAP and allowing the MAP thus formed slowly to cool to a temperature in the range of about 54° to 104° C. In another method for preparing MAP having a polyphosphate content in the range of up to about 10 weight percent a commercial aqueous ammonium phosphate fertilizer solution is treated by contacting it with an aqueous solution of $H_3PO_4$ in an amount sufficient to adjust the pH of the solution to about 3.0 and thereafter heating the solution to a temperature of about 100° C. for a time sufficient to obtain a pH of about 4.0 for the solution and subsequently allowing the MAP formed to cool slowly to a temperature in the range of about 54° to about 104° C. A fire retardant, insulating composition made using the methods above.

4 Claims, 2 Drawing Figures

SOLUBILITY OF SATURATED AMMONIUM PHOSPHATE SOLUTIONS

SOLUBILITY OF SATURATED AMMONIUM
PHOSPHATE SOLUTIONS

FIRE-RETARDANT INSULATING COMPOSITION AND ITS PRODUCTION

BACKGROUND OF THE INVENTION

This invention relates to fire retardant compositions. In one of its aspects, this invention relates to the production of fire-retardant compositions. In another of its aspects, this invention relates to the production of compositions that will impart fire retardance to cellulose-based insulation. In another of its aspects, this invention relates to methods for preparing monoammonium phosphate (MAP). In still another of its aspects this invention relates to a method for preparing MAP having a polyphosphate content in the range of up to about 10 weight percent.

During recent years, the need to conserve all forms of energy usage has greatly increased. To help meet this need the insulation industry has sought to provide insulation of improved quality. As a result, various types of insulation have been used such as glass fibers, foams, cellulose, etc. In addition to the insulating qualities of the various products, there should exist, either inherently or through additives, other important performance properties such as fire retardancy. Providing fire retardancy through use of additives is especially important for cellulose-based insulation products. Monoammonium phosphate is reported in such U.S. Pat. Nos. as 2,935,471 and 3,334,045 as an important ingredient in producing fire retardant insulation compositions based on cellulose.

The ammonium phosphates are prepared by the addition of ammonia to phosphoric acid, the latter of which is produced by either an electric furnace process or by a wet acid process. The electric furnace process is more expensive but products obtained are purer and, thus, more desirable for fire retardant compositions. The wet acid process is more economical but produces many impurities and, therefore, is largely restricted to use for the production of both liquid and solid fertilizers. It would be of great economic impact to use the fertilizer grade ammonium phosphate and the process equipment to produce fire retardant grade monoammonium phosphate. Unfortunately, fertilizer grade ammonium phosphate contains large amounts of diammonium phosphate which is undesirable as a fire retardant ingredient because of its low decomposition temperature. In addition, liquid fertilizer grade ammonium phosphate contains high levels (e.g., 65 weight percent) of polyphosphates that help to solubilize or stabilize the liquid fertilizer solution by sequestering metal impurities. Polyphosphates are undesirable from a fire retardant standpoint because they are hygroscopic and tend to impart high levels of moisture, and thereby cause tackiness on the surface of the cellulose insulation to which they have been applied. Higher forms of ammonium phosphate such as heptammonium phosphate, $(NH_4)_7H_2(PO_4)_3$, can be separated from fertilizer ammonium phosphate solutions which can then be converted to monoammonium phosphate in reasonably pure form for possible use in fire retardant compositions. However, this process which is described in U.S. Pat. No. 3,420,623 is a multi-step process subject to many process controls which increase production costs and chances for error.

In view of the difficulties mentioned, there exists a need for making available lower cost monoammonium phosphate with a polyphosphate content sufficiently low that it can be used as an ingredient in fire retardant chemical compositions.

It is therefore an object of this invention to provide a method for imparting fire retardance to a cellulose-based insulating material. It is another object of this invention to provide methods for producing monoammonium phosphate (MAP), particularly MAP having a polyphosphate content in the range of up to about 10 weight percent. It is still another object of this invention to provide fire retardant, cellulose-based insulating materials.

Other aspects, objects, and the various advantages of this invention will become apparent upon studying this disclosure, the appended claims, and studying the drawings.

STATEMENT OF THE INVENTION

According to this invention a method is provided for producing a fire retardant insulating composition. In this method monoammonium phosphate (MAP) solution having polyphosphate content in a range of about 0 to about 10 weight percent is incorporated into a cellulose-based insulating material in an amount that produces a non-tacky, fire retardant insulating composition.

In an embodiment of the invention the MAP incorporated into the cellulose-based insulating material is prepared by contacting $NH_3$ with an aqueous solution of $H_3PO_4$ at a temperature of up to about 177° C. (350° F.) and allowing the resulting MAP slowly to cool to a temperature in the range of about 54° to about 104° C.

In another embodiment of the invention MAP having a polyphosphate content in the range of up to about 10 weight percent is prepared from a conventional liquid ammonium phosphate fertilizer solution, such as the standard 10-34-0 fertilizer solution having a pH of about 5.8, by adding an aqueous solution of $H_3PO_4$ to the fertilizer solution in an amount sufficient to adjust the pH to about 3.0 and thereafter heating the solution to a temperature in the range of about 75° to about 125° C. for a time sufficient to reduce the level of polyphosphates and diammonium phosphate as indicated by attaining a pH of about 4.0 for the solution. The usual time of heating is in the range of about 1 to about 50 hours or preferably in the range of about 2 to 25 hours. Preferably a temperature in the range of about 90° to about 110° C. is obtained.

The embodiments of this invention wherein monoammonium phosphate low in polyphosphates is produced are represented by the following chemical equation.

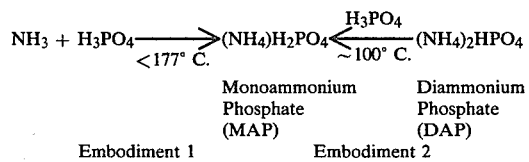

Embodiment 1      Embodiment 2

Figure 1:
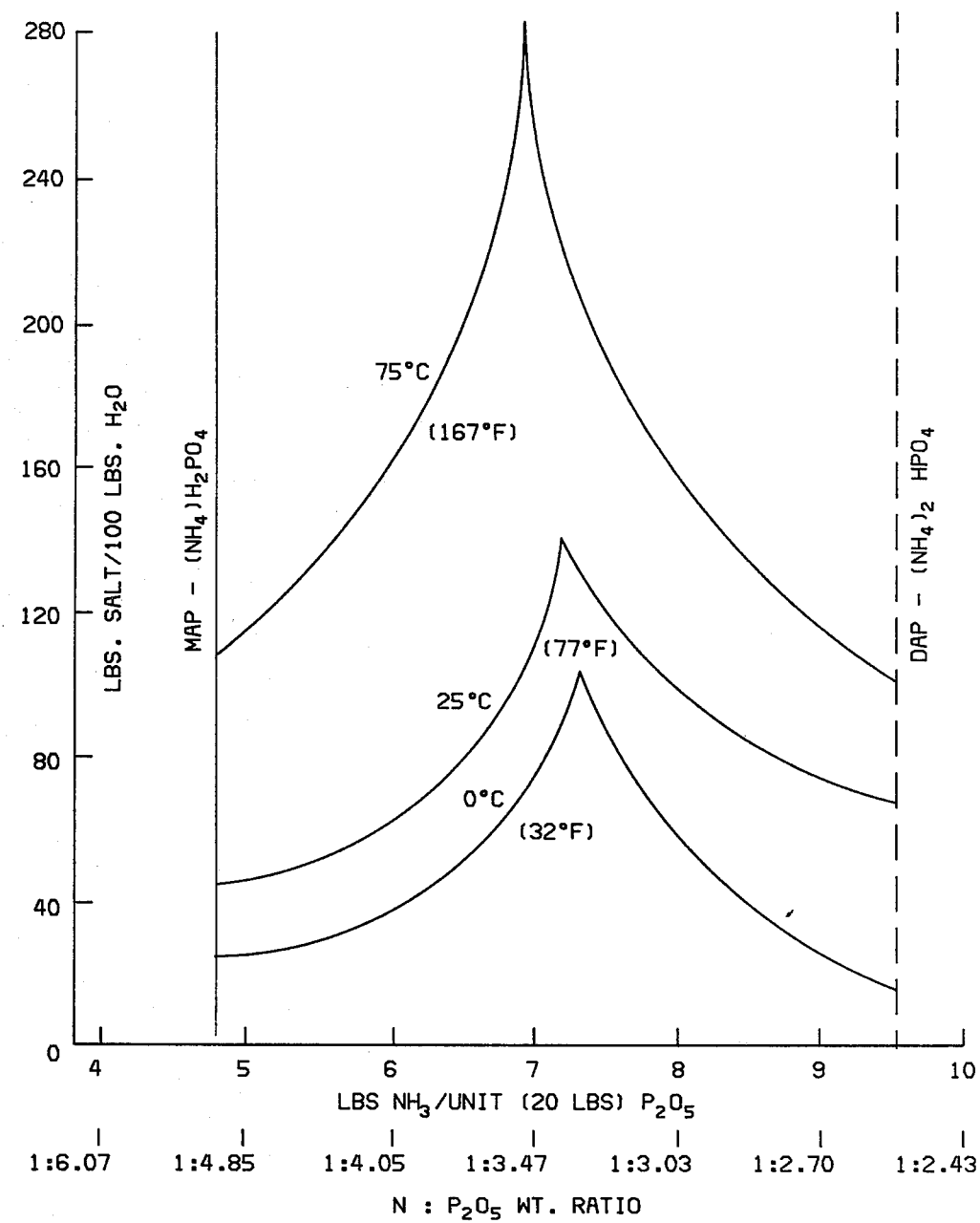
FIG. 1 sets forth the solubility of saturated ammonium phosphate solutions.

Ammonia can be used in this invention in either liquid or vapor phase but the amount of ammonia to be used must be carefully regulated such that when ammonia and phosphoric acid are reacted, as in embodiment 1 of the above equation, the ratio of ammonia to phosphoric acid expressed as phosphorous pentoxide must be maintained at slightly below 5 pounds of ammonia to 20 pounds of phosphorous pentoxide ($P_2O_5$), refer to FIG. 1. Above this ratio (e.g., 6 pounds ammonia/20 pounds $P_2O_5$) undesirable diammonium phosphate begins to form. FIG. 1 also shows the aqueous concentration of MAP, DAP, and mixtures thereof required to prevent crystallization at various temperatures.

The phosphoric acid used in this invention can be derived by the acidulation of phosphate rock and, depending on the process, is comprised of broadly from 1 to 80 weight percent but usually 50–75 weight percent $P_2O_5$, the balance of which is water. This wet process phosphoric acid process which is well known in the art generally produces 25 to 45 weight percent polyphosphates.

Wet process phosphoric acid can also be used within the scope of the second embodiment of this invention wherein DAP is converted to MAP by lowering the pH of the liquid ammonium phosphate fertilizer solution, by the addition of phosphoric acid followed by heat. The amount of phosphoric acid needed is best determined by withdrawing a sample from the reaction mixture, diluting with water to a concentration of 20 weight percent or less and measuring the amount of acid needed to reach a specific pH at various concentrations. Table I slows the required pH at various concentrations as taken from FIG. 1.

TABLE I

| Ammonium Phosphate Type | Required pH at Various Aqueous Concentration | | |
|---|---|---|---|
| | 2 Wt. % | 10 Wt. % | 20 Wt % |
| $(NH_4)H_2PO_4$ | 7.75 | 7.70 | — |
| $(NH_4)_2HPO_4$ | 4.3 | 3.9 | 3.52 |

Figure 2:
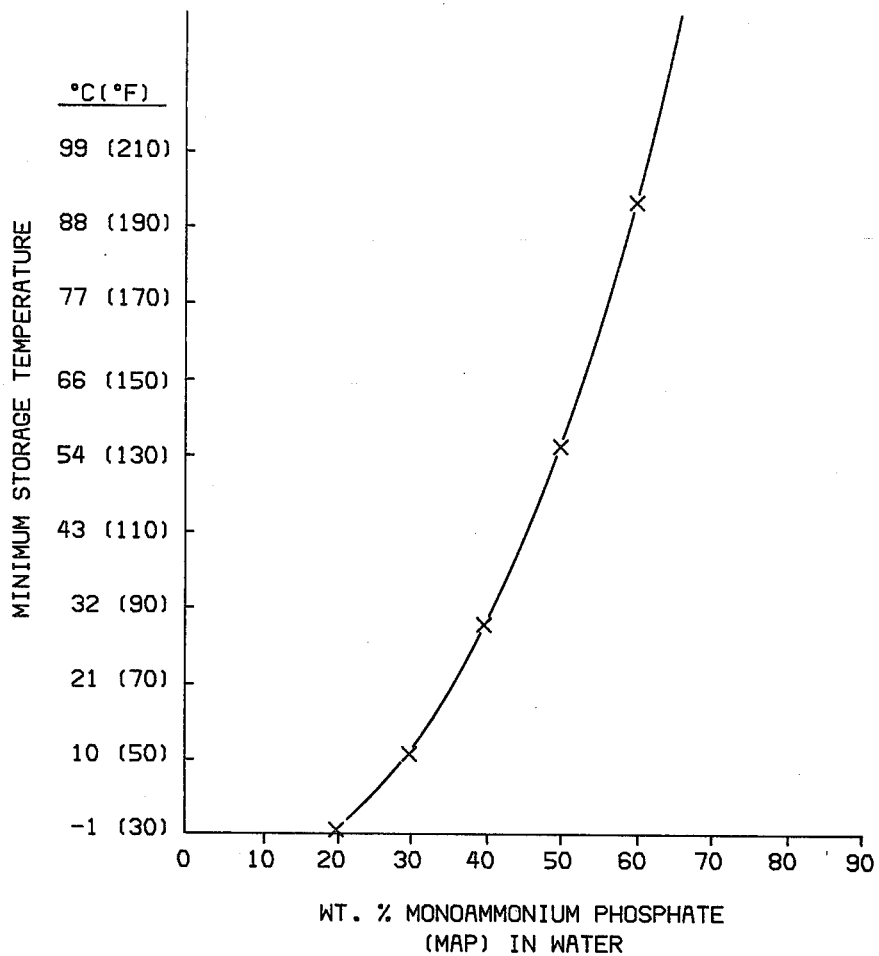
FIG. 2 sets forth the weight percent of monoammonium phosphate that would be held in solution in water at a minimum storage temperature without crystallizing it from the solution.

Water is the third ingredient used in this embodiment of the invention. The amount of water required is chiefly determined by the particular demands by the user and the temperature at which the MAP solution is to be stored or transported. FIG. 2 shows the minimum temperature at which an aqueous solution of MAP can exist without crystallization or precipitation of MAP. For example, a minimum temperature of about 71° C. (160° F.) is necessary to prevent crystallization of a 55 weight percent aqueous MAP solution. Therefore, the reaction mixtures from either embodiments herein described must be diluted to an aqueous concentration of 55 weight percent, but only if the minimum temperature before usage is about 71° C. (160° F.).

The preparation of MAP employing the first embodiment of the current invention can be carried out batchwise or in a continuous manner. A satisfactory continuous operation envisioned within the scope of this invention is the so-called "Pipe Reactor Process" largely used in the fertilizer industry. Such a pipe reactor is described in an article by F. P. Achorn, H. L. Balay, and H. L. Kimborough in "Solutions", March–April, 1973 incorporated here by reference. When the first embodiment of the current invention, namely the reaction of 1 mole of ammonia and 1 mole of $H_3PO_4$, is used in a pipe reactor process, the temperature of the reaction mixture within the pipe reactor is allowed to go no higher than about 177° C. Temperatures below 177° C. (350° F.) are considered satisfactory in the continuous pipe reactor process to minimize polyphosphate formation. Temperatures above 316° C. (600° F.) are normally employed in the pipe reactor when ammonium phosphate fertilizer is being prepared. The reaction product is not immediately temperature quenched as when ammonium phosphate fertilizer is prepared but rather the temperature is slowly allowed to drop to the temperature at which the aqueous MAP solution is to be stored or transported. In the preparation of ammonium phosphate fertilizer, the temperature is quickly reduced to maintain the high (e.g., 65 weight percent) level of polyphosphates needed during the subsequent liquid fertilizer storage and application. In the present invention, the elevated temperature is maintained for two reasons—(1) to help lower the polyphosphate level below 10 weight percent, preferably to 0 weight percent and (2) to supply heat needed to solubilize the MAP solution during storage and transportation. In addition, higher concentrations of MAP can exist at higher temperatures and, thus, some economical advantages are obtained.

The heat used to help solubilize the MAP solution is largely obtained by the heat of reaction between ammonia and $H_3PO_4$. Only a small amount of additional heat is necessary to maintain solubility during storage. The temperature range employed is generally determined by the concentration of MAP solution required by the user (see FIG. 2). Nevertheless, temperatures ranging from about 54° C. (130° F.) to about 104° C. (220° F.) are envisioned as preferred during storage and transportation.

The second embodiment of this invention, the conversion of DAP to MAP by the addition of $H_3PO_4$ to provide a specific pH followed by a heating step, can also be carried out batch-wise or continuously. Pressure is not a critical item in either embodiment of this invention. Pressures from 0 to 500 psig are commonly used. Whichever embodiment is used the pH of the final solution is adjusted using the values in Table I according to the final ammonium phosphate concentration desired. The concentrations of aqueous phosphate solutions which can be used to treat cellulose insulation can be in the range of about 10 to about 50 percent by weight. Sufficient solution is added to provide an insulation containing 5–40 weight percent phosphate. Treating the insulation is by contacting the solid material with the phosphate solution by any means available such as immersion, tumbling together, spraying, etc. Subsequent to contacting the insulating material with the solution the treated solids can be subjected to heat, as in an oven, at an elevated temperature of up to about 230° F. (110° C.) for a time sufficient to dry the insulation.

EXAMPLE I

This example illustrates a method of converting a high polyphosphate liquid ammonium phosphate fertilizer (10-34-0) to a low polyphosphate liquid ammonium phosphate. The intent was to show the effect of polyphosphate concentration on the degree of hygroscopicity when applied to cellulose-based insulation. Since the ammonium phosphate was not used as an ingredient in an actual fire retardant composition and the subsequent flammability tests determined, the conversion of DAP to MAP by diluting with water and lowering the pH to about 4.0 was not carried out in this example.

To a 3-liter round bottom flask fitted with a mechanical stirrer and thermometer was added 1,375 grams of a commerical 10-34-0 liquid ammonium phosphate fertilizer solution (obtained from the American Fertilizer Co.). The liquid fertilizer solution was comprised of metal impurities (present in the wet process $H_3PO_4$), about 50 weight percent water and about 50 weight percent ammonium phosphate, the latter of which contains about a 1:1 weight ratio of monoammonium phosphate and diammonium phosphate. The phosphate portion of the fertilizer solution exists as about 65-68 weight percent polyphosphates and 33 weight percent ortho phosphate. With stirring, the solution was heated between 94°–100° C. for 23 hours. The gelled solution was treated with a small amount of anhydrous ammonia to adjust the pH from 5.45 to 5.82 (standard 10-34-0 liquid fertilizer solution has a pH of 5.82). The total product was mixed in a Waring Blender to break up gel and lumps. Element analysis showed 10.26 weight percent N and 34.3 weight percent $P_2O_5$. The polyphosphate content was reduced from about 67 weight percent to 7.3 weight percent. The amount of polyphosphates was determined by AOAC (Association of Agricultural Chemists) Method 2.018-22 which is a method of determining ortho phosphates using a molybdenum salt, the polyphosphates calculated by difference between the total phosphates present and the amount of ortho phosphate present. Thus this example demonstrated that heat treatment of the fertilizer solution greatly reduced its polyphosphate content to the level desired for fire retardant usage.

EXAMPLE II

This example illustrates the conversion of a mixture of MAP and DAP to 100 percent MAP and also the conversion of high polyphosphate to low polyphosphate solutions. To 5 four-liter beakers was added about 5 gallons of a 10-34-0 commercial liquid ammonium phosphate fertilizer solution. The pH was adjusted to about 3.0 by means of a commercial fertilizer grade wet process phosphoric acid (70 weight percent $P_2O_5$). Afterwards each beaker and contents was heated to near boiling (100° C.) for 3-4 hours. The solution now had a pH of 4.0 with 5 weight percent N, 26 weight percent $P_2O_5$ and 4.6 weight percent polyphosphate. Because of the acidity and analysis of the solution, the dissolved solids (44 weight percent) in the solution were considered to be 100 percent monoammonium phosphate (MAP). Thus, this example demonstrates that a high polyphosphate fertilizer solution can be converted to a low or zero polyphosphate solution suitable for use in fire retardants.

EXAMPLE III

The following synthetic example is calculated and illustrates a method of making an aqueous solution of monoammonium phosphate with no diammonium phosphate and little if any polyphosphate starting from ammonia and fertilizer grade phosphoric acid as outlined in the first embodiment of this invention. The method illustrated is a batch reaction but can work equally well when carried out in a continuous manner such as in a pipe reactor. This calculated example describes the preparation of a one-ton batch of 55 weight percent aqueous monoammonium phosphate.

To a 500 gallon capacity open metal reactor is added 500 lbs of water and 1335 lbs of wet process 70 weight percent phosphoric acid. While the mixture is stirred rapidly, 164 lbs of anhydrous ammonia gas is added under the liquid surface by means of a submerged sparger at such a rate so as not to exceed about 110° C. (230° F.), the reaction being exothermic to this point. This temperature limit for this method of preparation is made to prevent any possible loss of unreacted ammonia. A cooling coil is employed to maintain the temperature below 110° C. After about 30-60 minutes a sample of reaction mixture is removed, diluted to 10 percent aqueous concentration and its pH measured at 25° C. The sample is diluted to prevent crystallization during the pH measurement which is usually carried out at about 25° C. The additional amount of either ammonia or phosphoric acid required to get a pH of 3.9 is then determined and this amount is then proportioned to the amount needed in the larger batch reaction mixture. Because of the temperature employed and variations in different lots of phosphoric acid, some water is generally lost. The amount of water needed to be added to the reaction mixture is then calculated on the basis of maintaining a specific gravity of 1.435 at 24° C. (75° F.). Because of the length of time at elevated temperatures coupled with the pH of the resulting product mixture, the 55 weight percent concentrated liquid ammonium phosphate solution contains less than 5 weight percent polyphosphates.

EXAMPLE IV

This example illustrates the use of a low polyphosphate ammonium phosphate ingredient used to reduce hygroscopicity of a cellulose insulation. Boric acid is another fire retardant ingredient presently in short supply and for which monoammonium phosphate could be a potential partial replacement.

Ordinary newspaper was pulverized in a Waring Blender. To 6.56 grams of pulverized newspaper was added 2.88 grams of an 18 weight percent aqueous solution of a 10-34-0 ammonium phosphate low polyphosphate solution described in Example I. The paper and solution was tumbled and mixed for 10-15 minutes. The resulting impregnated cellulose was observed for tackiness. The impregnated product was then oven dried for 30 minutes at 105° C., cooled and any tackiness again measured. The experiment was repeated except aqueous boric acid and aqueous high polyphosphate ammonium phosphate was employed instead of low polyphosphate ammonium phosphate. The results which are shown in Table II (Runs 4 and 5) indicate ammonium phosphate low in polyphosphate does not impart tackiness to a cellulose material potentially useful in insulation type products. The results also show that low polyphosphate ammonium phosphate performs the same as boric acid a known fire retardant ingredient. Tackiness in insulation products is an indication that the ingredient being applied will absorb more moisture. Moisture present in insulation products can result in corrosion of nails, heating ducts and electric wires, a potential hazard for the building industry.

TABLE II.

| | | Effect of Additive Type and Concentration on Tackiness of Cellulose Insulation | | | |
|---|---|---|---|---|---|
| | | Wt., %, in Final Insulation | | Tackiness | |
| No. | Additive[a] | No Drying | Dried[b] | No Drying | Dried[b] |
| 1. | Commercial Insulation[c] - Control | — | — | No | No |
| 2. | Boric Acid | 18 | 18 | No | No |
| 3. | 10-34-0 | 30.6 | 20.9 | Yes | Trace |

TABLE II.-continued

Effect of Additive Type and Concentration on Tackiness of Cellulose Insulation

| No. | Additive[a] | Wt., %, in Final Insulation | | Tackiness | |
|---|---|---|---|---|---|
| | | No Drying | Dried[b] | No Drying | Dried[b] |
| 4. | Ammonium Phosphate 64% Polyphosphates[d] 10-34-0 Ammonium Phosphate 7% Polyphosphate | 30.6 | 20.9 | Trace | No |
| 5. | 10-34-0 Ammonium Phosphate 7% Polyphosphate | 18 | 11.7 | No | No |

[a]Additives applied as an 18 wt. % aqueous solution except No. 3.
[b]Dried 1 hr. at 105° C.
[c]Superior Products Co. - blown insulation.
[d]American Fertilizer Co. product N-70, applied as received (60 wt. % aqueous solution).

We claim:

1. A method for producing a fire retardant insulating composition comprising incorporating into a cellulose-base insulating material a phosphate composition consisting essentially of an amount of monoammonium phosphate (MAP) sufficient to provide fire retardance, said phosphate composition having polyphosphate content in the range of about 3 to about 8 weight percent thereby producing a non-tacky, fire retardant insulating composition.

2. A method of claim 1 wherein said MAP is prepared by the method comprising contacting $NH_3$ with an aqueous solution of $H_3PO_4$ at a temperature in a range of up to about 177° C. thereby forming MAP and allowing the MAP formed to cool to a temperature in the range of about 54° C. to about 104° C.

3. A method of claim 1 wherein said MAP is prepared by the method comprising contacting an aqueous ammonium phosphate fertilizer solution with an amount of an aqueous solution of $H_3PO_4$ sufficient to adjust the pH of the combined aqueous solutions to about 3.0 and subsequently heating the combined solutions to a temperature of about 75° C. to about 125° C. for a time sufficient to attain a pH of about 4.0 for the solution.

4. A fire retardant insulating composition produced by the method of claim 1, 2, or 3.

* * * * *